US010746298B2

(12) United States Patent
Gittins et al.

(10) Patent No.: US 10,746,298 B2
(45) Date of Patent: Aug. 18, 2020

(54) TRANSMISSION CONTROLS TO MITIGATE LINE PRESSURE INSTABILITY (71) Applicant: Ford Global Technologies, LLC, Dearborn, MI (US)

(72) Inventors: Scott Joseph Gittins, Ann Arbor, MI (US); Andrew James Myrna, Royal Oak, MI (US); Jessica Dyan Britton, Belleville, MI (US); Timothy Fedullo, Northville, MI (US); Samuel Melville Glauber, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 16/113,123

(22) Filed: Aug. 27, 2018

(65) Prior Publication Data
US 2020/0062258 A1 Feb. 27, 2020

(51) Int. Cl.
F16H 63/34 (2006.01)
B60W 30/18 (2012.01)
B60W 10/06 (2006.01)
B60W 10/196 (2012.01)
F16H 61/00 (2006.01)
F16H 59/68 (2006.01)
F16H 59/74 (2006.01)

(52) U.S. Cl.
CPC ......... *F16H 63/3491* (2013.01); *B60W 10/06* (2013.01); *B60W 10/196* (2013.01); *B60W 30/18054* (2013.01); *F16H 61/0025* (2013.01); *F16H 63/3458* (2013.01); *F16H 63/3483* (2013.01); *B60W 2510/0208* (2013.01); *B60W 2510/108* (2013.01); *B60W 2510/188* (2013.01); *B60W 2710/065* (2013.01); *B60W 2710/188* (2013.01); *F16H 59/68* (2013.01); *F16H 59/74* (2013.01); *F16H 2059/683* (2013.01); *F16H 2059/6807* (2013.01); *F16H 2059/746* (2013.01)

(58) Field of Classification Search
CPC ............. F16H 63/3458; F16H 63/3483; F16H 63/3491
See application file for complete search history.

(56) References Cited

U.S. PATENT DOCUMENTS

| 4,550,747 | A | 11/1985 | Woodworth et al. |
| 5,127,495 | A | 7/1992 | Verner et al. |
| 6,504,474 | B1 | 1/2003 | Goodnight et al. |
| 8,050,828 | B2 | 11/2011 | Dlugoss et al. |
| 8,855,878 | B2 | 10/2014 | Otanez et al. |
| 9,702,417 | B2 | 7/2017 | Dix et al. |
| 2014/0207350 | A1 | 7/2014 | Dix et al. |

*Primary Examiner* — David R Morris
(74) *Attorney, Agent, or Firm* — Vincent Mastrogiacomo; Brooks Kushman, P.C.

(57) ABSTRACT

Air ingestion into a transmission hydraulic system may lead to a number of issues. For example, the time to engage a hydraulically actuated parking mechanism may be excessive. As another example, the pump may not prime properly on a subsequent engine start. The air ingestion issue may be detected based on variability of transmission line pressure. When the line pressure variability exceeds a threshold, actions are taken to mitigate the potential issues.

10 Claims, 8 Drawing Sheets

TRANSMISSION CONTROLS TO MITIGATE LINE PRESSURE INSTABILITY

TECHNICAL FIELD

This disclosure relates to the field of control systems for automatic transmissions for motor vehicles. More particularly, the disclosure relates to methods of mitigating adverse effects of line pressure instability.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low.

SUMMARY OF THE DISCLOSURE

A vehicle includes a transmission, an electronic park brake, and a controller. The transmission includes a fluid pressure sensor and a hydraulically actuated park mechanism. The controller is programmed to, responsive to a request for park, command engagement of the hydraulically actuated park mechanism. When variation of a reading from the pressure sensor is greater than a threshold, the controller commands the electronic parking brake to engage until engagement of the hydraulically actuated park mechanism completes. The pressure sensor may be configured to measure a pressure of fluid leaving a pump. The pressure sensor may be configured to measure a pressure of fluid in the clutch apply chamber which is equal to the pressure of fluid leaving the pump when the clutch is fully engaged. The controller may release the electronic parking brake in response to confirming engagement of the hydraulically actuated park mechanism. The controller may compute the variation by calculating a standard deviation over a number of readings preceding the request for park.

In another embodiment, a vehicle includes an engine, a transmission, and a controller. The transmission includes a pressure sensor. The controller is programmed to set an engine idle speed upon an engine start based on a variation of readings from the pressure sensor at a time of a preceding engine shutdown such that the idle speed is higher in response to the variation exceeding a threshold. The transmission may include a pump. The pressure sensor may be configured to measure a pressure of fluid leaving the pump. The controller may be further programmed to reduce the idle speed following the engine start in response to readings from the pressure sensor indicative of the pump being primed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
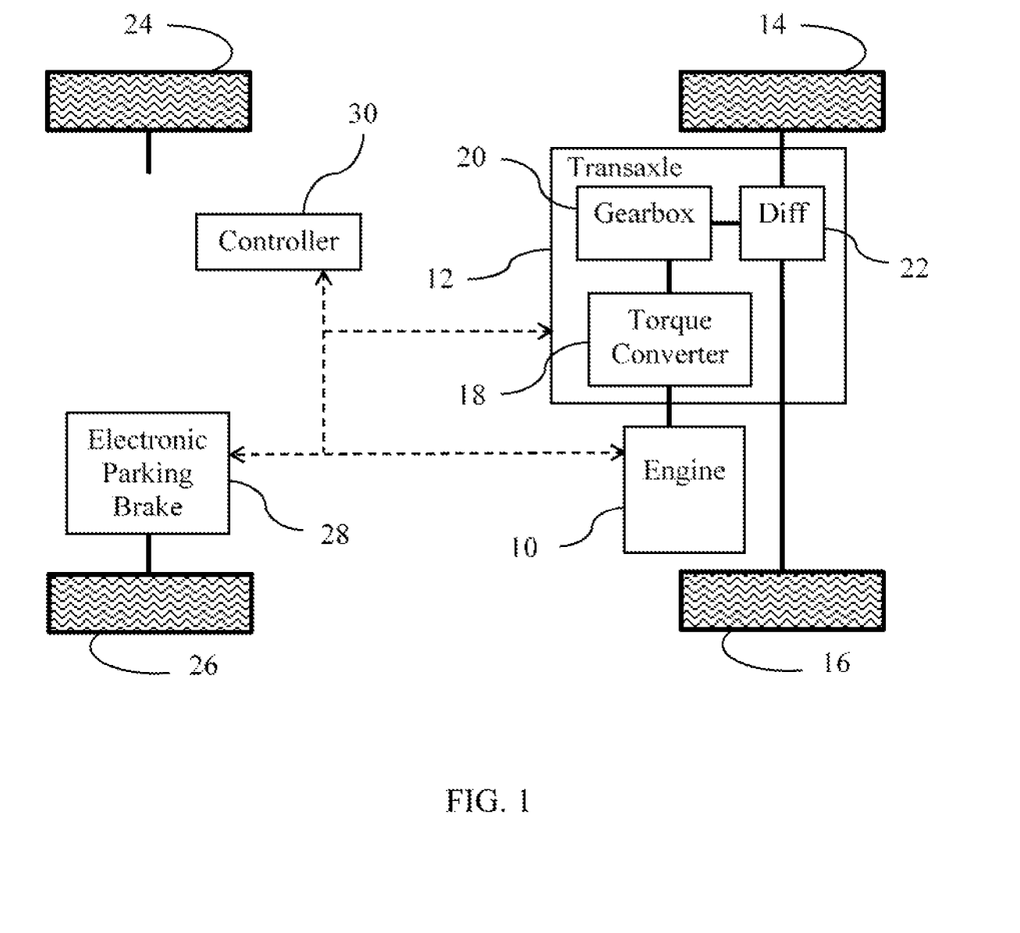
FIG. 1 is a schematic of a vehicle powertrain.

FIG. 1 schematically illustrates a vehicle with a front wheel drive powertrain. Power is provided by internal combustion engine 10. Transaxle 12 adjusts the speed and torque produced by engine 10 based on current vehicle requirements and delivers the power to front wheels 14 and 16. Transaxle 12 may include a torque converter 18, a shiftable gearbox 20, and a differential 22. The transaxle 12 also includes a park mechanism, mounted to the output of the gearbox 20 or the input of differential 22 to hold the vehicle stationary. Rear wheels 24 and 26 are not powered. An Electronic Parking Brake 28 holds at least one of the drive wheels stationary independent of the transaxle parking mechanism. In FIG. 1, the EPB is shown attached to one of the rear wheels. Controller 30 issues instructions to engine 10, transaxle 12, and EPB 28 based on sensors that indicate driver intention such as an accelerator pedal and brake pedal, and various other sensors indicating powertrain and other vehicle conditions. A rear wheel drive powertrain includes similar components except that the rear wheels are powered instead of the front wheels. Four wheel drive and all wheel drive powertrains distribute power to all four wheels.

Figure 2:
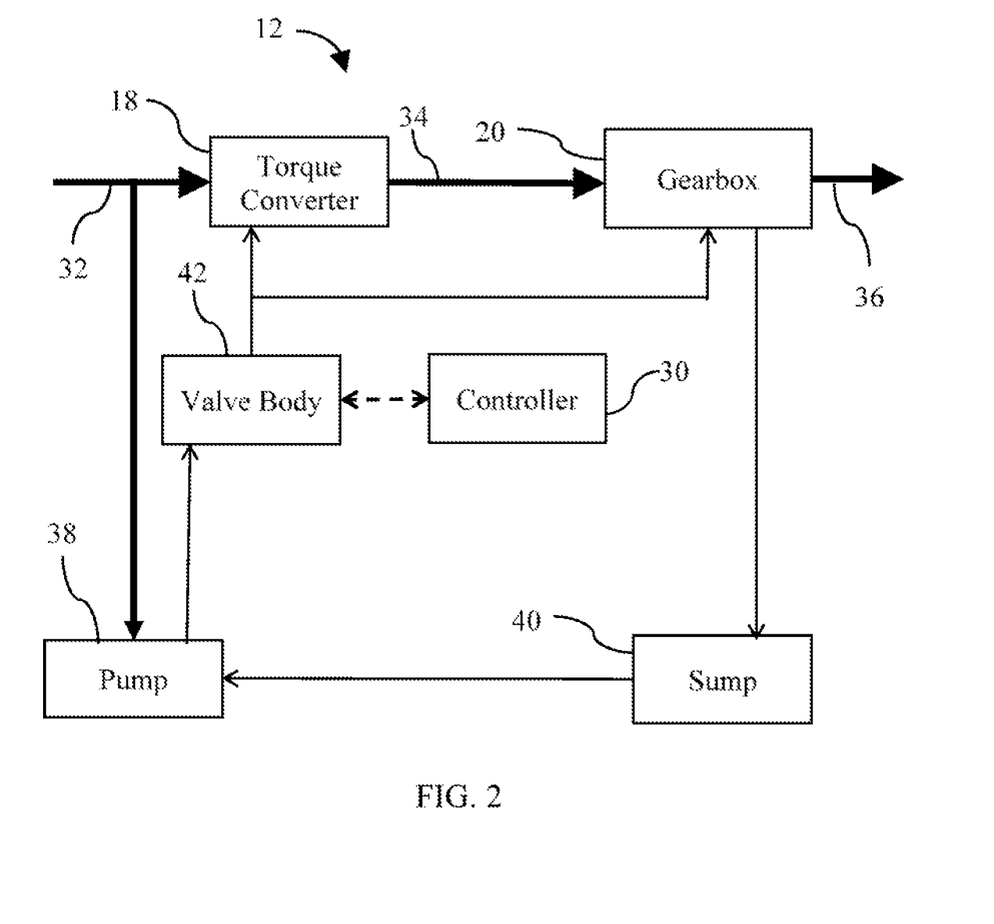
FIG. 2 is a schematic diagram of a transmission system.

FIG. 2 schematically illustrates transaxle 12 in more detail. Bold solid lines represent mechanical power flow connections. Thin solid lines represent the flow of hydraulic fluid. Dashed lines represent the flow of information signals. Power is supplied from engine 10 at input shaft 32. Torque converter 18 includes an impeller driveably connected to input shaft 32 and a turbine driveably connected to turbine shaft 34. Power is transmitted from the impeller to the turbine via moving fluid whenever the impeller rotates faster than the turbine. A stator may redirect the fluid when the impeller is rotating substantially faster than the impeller such that the turbine torque is a multiple of the impeller torque. Gearbox 20 includes gearing and shift elements configured to establish various power flow paths between turbine shaft 34 and output shaft 36. Each power flow path may be established by engaging a specified subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

Most of the shift elements within gearbox 20 are engaged by supplying hydraulic fluid at an elevated pressure to a clutch apply chamber. (Gearbox 20 may also include passively engaged one-way clutches or electrically actuated elements.) Each shift element may include a clutch pack having friction plates splined to one component interleaved with separator plates splined to a different component. The pressurized fluid forces a piston to squeeze the clutch pack such that frictional force between the friction plates and the separator plates couples the components. The torque capacity of each shift element varies in proportion to changes in the fluid pressure. Pump 38, driven by input shaft 32, draws fluid from sump 40 and delivers it at an elevated pressure to valve body 42. Valve body 42 delivers the fluid to the clutch apply chambers at a pressure controlled in accordance with signals from powertrain controller 30. In addition to the fluid provided to clutch apply chambers, valve body provides fluid for lubrication and provides fluid to torque converter 12. The fluid eventually drains from gearbox 20 and valve body 42 back to sump 40 at ambient pressure.

Figure 3:
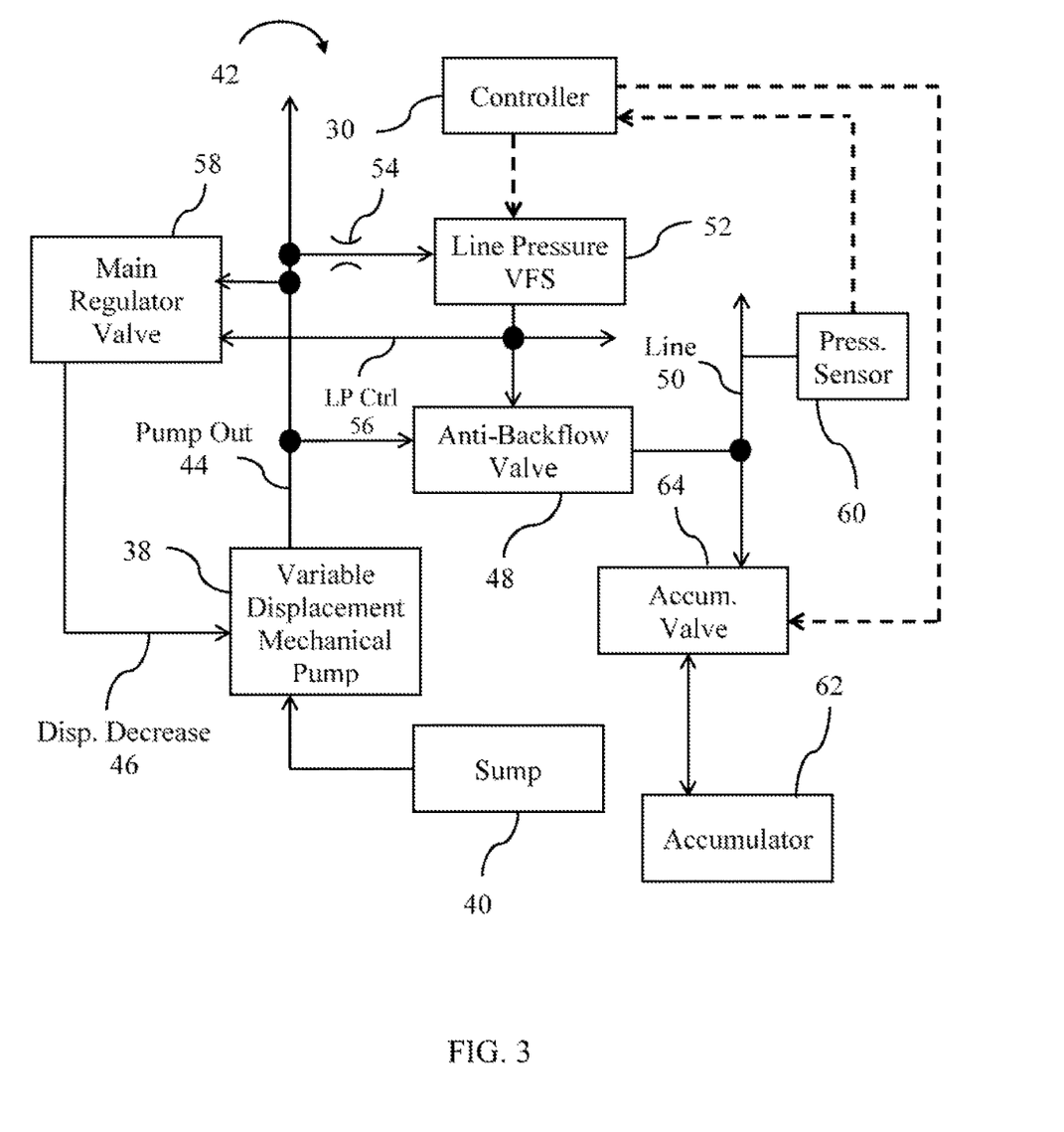
FIG. 3 is a schematic diagram of a fluid supply subsystem of a hydraulic control system for the transmission of FIG. 2.

FIG. 3 schematically illustrates a portion of valve body 42 that constitutes a fluid supply subsystem. A similar fluid supply subsystem is discussed in U.S. Patent Application Publications 2013/0014498 and 2013/0017112 which are incorporated by reference in their entirety herein. Pump 38, which is driven by the transmission input shaft, draws fluid from sump 40 and delivers the fluid to pump out circuit 44. Pump 38 is a positive displacement pump. Disregarding leakage, positive displacement pumps deliver a certain amount of fluid per revolution of the pump shaft regardless of the relative pressure at the pump inlet and pump outlet. The amount of fluid delivered per revolution is called the pump displacement. The displacement of pump 38 varies within predefined limits based on the pressure in displacement decrease circuit 46. The torque required to rotate the pump shaft increases as the pressure at the pump outlet increases relative to the pressure at the inlet and also increases in proportion to the pump displacement.

During normal operation, anti-backflow valve 48 is open such that fluid flows freely from the pump out circuit 44 to the line pressure circuit 50 and the pressure in the two circuits is substantially equal. The controller 30 adjust the pressure in these two circuits by sending a command to line pressure Variable Force Solenoid (VFS) 52. Fluid flows from the pump out circuit 44, through an orifice 54, through a valve opening in line pressure VFS 52 and then into LP Ctrl circuit 56. The pressure drop from the pump output circuit 44 to the LP Ctrl circuit 56 varies depending upon the size of the opening in line pressure VFS 52. The size of the opening in line pressure VFS 52 varies based on movement of a spool. Electrical current from controller 30 creates a magnetic force on the spool tending to enlarge the opening. Fluid in the LP Ctrl circuit 56 acts on an area of the spool to create a force tending to reduce the size of the opening. An equilibrium is reached at which the pressure in the LP Ctrl circuit 56 is proportional to the electrical current.

Main regulator valve 58 adjusts the displacement of pump 38 in order to maintain the pressure in pump out circuit 44 proportional to the pressure in the LP Ctrl circuit 56. Pressure in the LP Ctrl circuit 56 generates a force on a spool in main regulator valve 58. Pressure in the pump out circuit 44 generates a force on the spool valve in the opposite direction. When the pressure in the pump out circuit 44 exceeds the pressure in the LP Ctrl circuit 56, the spool moves to allow flow from pump out circuit 44 to displacement decrease circuit 46. Pressure in circuit 46 causes a reduction in the flow rate from pump 38 into the pump out circuit 44. Components fed by the pump out circuit 44 and the line pressure circuit 50 establish a relationship between the pressure in these circuits and the flow rate. Consequently, the reduction in flow rate results in a reduction in the pressure in pump out circuit 44 until an equilibrium is reached. To aid in controlling line pressure and pump out pressure, some embodiments may include a pressure sensor 60.

When the vehicle is stopped, such as when waiting at a traffic light, powertrain controller 30 may shut off the engine to conserve fuel. When the driver again demands torque by releasing the brake and depressing the accelerator pedal, the controller restarts the engine. In order to respond quickly after the engine is restarted, it is important to maintain some clutches in an engaged state or to rapidly re-engage them. Fluid flow to maintain these clutches is provided by accumulator 62 which feeds line pressure circuit 50 via accumulator control valve 64. When the engine is running and the pressure in the line pressure circuit exceeds the pressure in the accumulator, controller 30 opens valve 64 to charge the accumulator. In some embodiments, charging of the accumulator may be accomplished passively by a check valve in parallel with valve 64. During engine shutdown periods, controller 30 pressurizes line pressure circuit 50 by opening valve 64. During these engine shutdown periods, controller 30 also sets the current to line pressure VFS 52 to an intermediate level causing the pressure in LP Ctrl circuit 56 to be at an intermediate level. In response to this reduction in LP Ctrl pressure, the spool of anti-backflow valve 48 moves to a position in which the line pressure circuit is isolated from the pump out circuit 44, reducing the number of components that must be fed by the accumulator.

Figure 4:
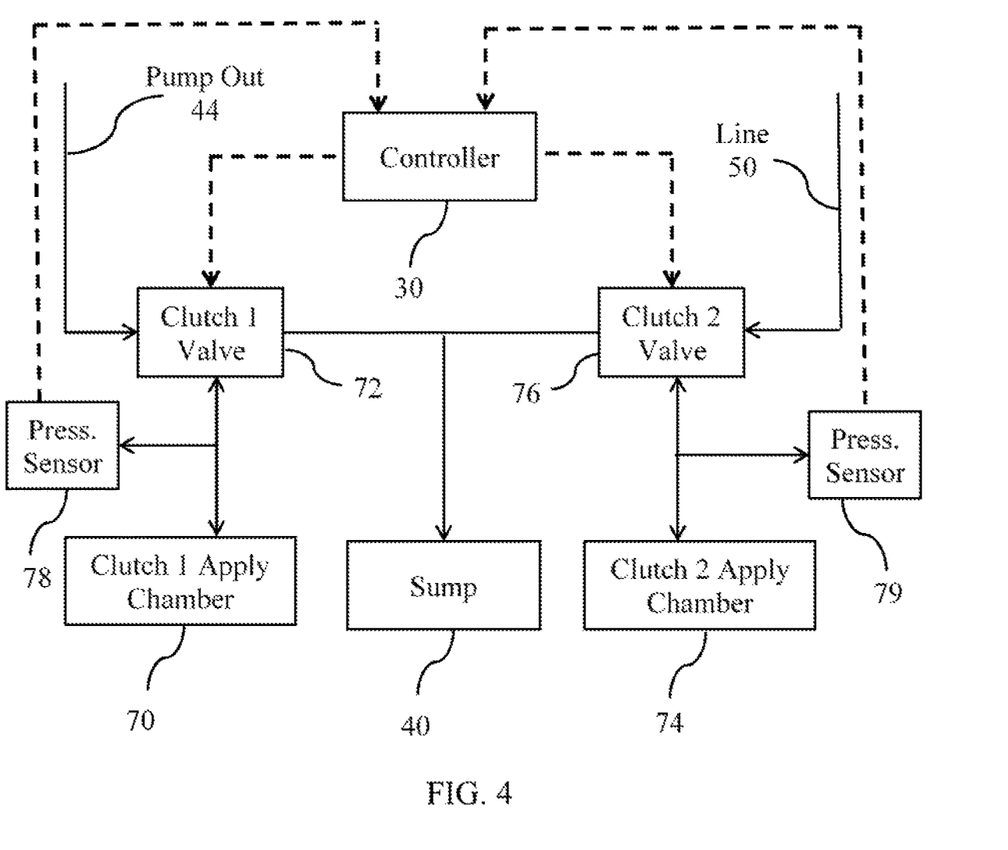
FIG. 4 is a schematic diagram of a portion of the shift element control subsystem of a hydraulic control system for the transmission of FIG. 2.

FIG. 4 schematically illustrates a portion of a clutch control subsystem. The clutch apply chamber of a first shift element 70 is supplied from the pump out circuit 44 via a VFS valve 72. As a result, shift element 70 can only be applied when the engine is running. To engage the shift element, the controller commands valve 72 to set the pressure of the clutch apply chamber to a value between zero and the pressure in pump out circuit 44. The controller adjusts the pressure by adjusting a current to a solenoid in valve 72. When the current is set to zero, valve 70 isolates the clutch apply chamber from pump out circuit 44 and connects clutch apply chamber 70 to sump 40 thereby allowing the fluid to escape to release the clutch. Although a single valve is shown for simplicity, the system may include a latch valve or other supplemental valves. Similarly, the clutch apply chamber of a second shift elements 74 is supplied from the line pressure circuit 50 via a VFS valve 76. As a result, shift element 74 can be applied even when the engine is not running. To engage clutch 2, the controller commands valve 76 to set the pressure of the clutch apply chamber 74 to a value between zero and the pressure in line pressure circuit 50. The controller adjusts the pressure by adjusting a current to a solenoid in valve 76. When the current is set to zero, valve 76 isolates the clutch apply chamber from line pressure circuit 50 and connects clutch apply chamber 74 to sump 40 thereby allowing the fluid to escape to release the clutch. Additional shift elements are controlled similarly, some supplied by the line pressure circuit 50 and some supplied by the pump out circuit 44.

Pressure sensors 78 and 79 measure the fluid pressure in clutch apply chambers 70 and 74 respectively and report the pressure to controller 30. During shifting, this information helps controller 30 set the clutch torque more accurately. Clutch pressure sensors may be present for some clutches but not for others. When clutch 1 is in a steady state fully engaged condition, pressure sensor 78 provides an accurate indication of the pressure in pump out circuit 44. Similarly, when clutch 2 is in a steady state fully engaged condition, pressure sensor 79 provides an accurate indication of the pressure in line pressure circuit 50. As a result, if pressure sensor 60 is not present, or is inoperative, readings from sensors 78 and 79 may be used during operating conditions in which the respective clutch is fully engaged.

Figure 5:
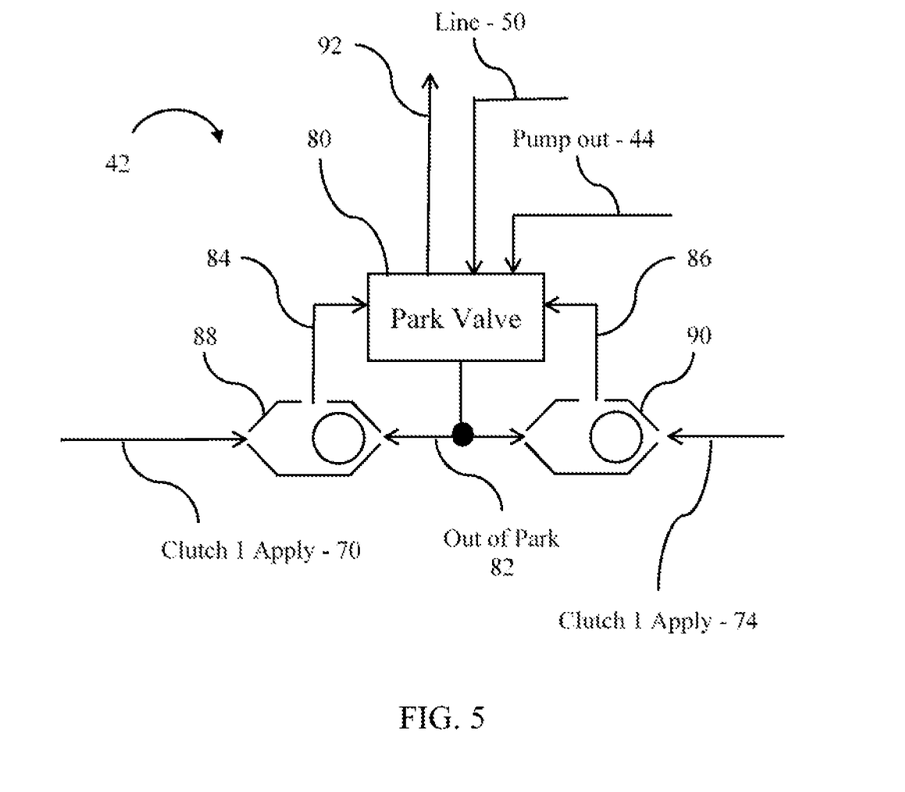
FIG. 5 is a schematic diagram of a park subsystem of a hydraulic control system for the transmission of FIG. 2.

FIG. 5 schematically illustrates the park control subsystem of valve body 42. A spool of park valve 80 is mechanically linked to the park mechanism, such that movement of the spool in one direction engages the park mechanism and movement in the opposite direction disengages the park mechanism. A spring within the park mechanism biases the system toward engagement. Also, pressure in the pump out circuit 44 acts on an area of the spool to bias the system toward park engagement. Park valve 80 fluidly connects an out-of-park circuit 82 to the line pressure circuit 50 when park is disengaged and vents out-of-park circuit 82 when park is engaged. Hydraulic circuits 84 and 86 bias the park valve toward the disengaged position. Check valve 88 fluidly connects circuit 84 to either clutch 1 apply circuit 70 or out-of-park circuit 82, whichever has the higher pressure. Similarly, check valve 90 fluidly connects circuit 86 to either clutch 2 apply circuit 74 or out-of-park circuit 82, whichever has the higher pressure.

When the park mechanism is engaged, both the park mechanism itself and pressure in pump out circuit 44 tend to hold park valve 80 in the engaged position. To disengage the park mechanism, clutches 1 and 2 are engaged by commanding full pressure to apply circuits 70 and 74. Check valves 88 and 90 fluidly connect these clutch apply circuits to circuits 84 and 86 respectively. Pressure in circuits 84 and 86 force the park valve into the disengaged position. Once in the disengaged position, park valve 80 fluidly connects out-of-park circuit 82 to line pressure circuit 50. As a result, the park valve tends to stay in the disengaged position even if clutches 1 and 2 are later released. To re-engage the park mechanism, the pressure in pump out circuit 44 and thus line pressure circuit 50 is reduced to a level at which the park mechanism spring forces the park valve to the engaged position. Once in the disengaged position, park valve 80 vents the out of park circuit 82 to sump via vent circuit 92.

As mentioned above, fluid is released from the valve body at several points and must drain back to the sump. Fluid from the valve body, as well as fluid used for lubrication and cooling of rotating transmission components, drains back to the sump by gravity. In a transaxle, the valve body may be considerably higher than the sump. Typically, the fluid runs along a wall of the transmission case back to the sump. When the fluid is cold, the viscosity is high. When the viscosity is high, the fluid moves slower and it may take considerably longer for fluid to return to the sump. As a result, the fluid level in the sump may decrease such that the pump inlet brings in air along with transmission fluid. This may interfere with the normal operation of the fluid supply subsystem to regulate the pressure of fluid in pump out circuit 44 and line pressure circuit 50. In these circumstances, the pressure in the line pressure circuit and the pump out circuit may become unstable and fluctuate widely.

When the pressure in pump out circuit 44 and line pressure circuit 50 is not stable, the hydraulic park system may not respond promptly. Specifically, a command to disengage the park pawl may not produce that effect as quickly as it normally would. It is critical to limit the delay between a driver selecting park and the vehicle being secured. One way to avoid a delay in securing the vehicle is to utilize electronic parking brake 28. Each time the electronic parking brake is engaged and disengaged, some wear occurs. Therefore, it is beneficial to engage the electronic parking brake only in situations in which the hydraulically actuated park mechanism is likely to be slow. The inventors have discovered that hydraulically actuated park engagement time is correlated with variation of pressure readings from pressure sensor 60. Specifically, excessively slow engagements are only observed when the standard deviation of the pressure readings over a brief interval preceding the request to enter park exceed a threshold.

Figure 6:
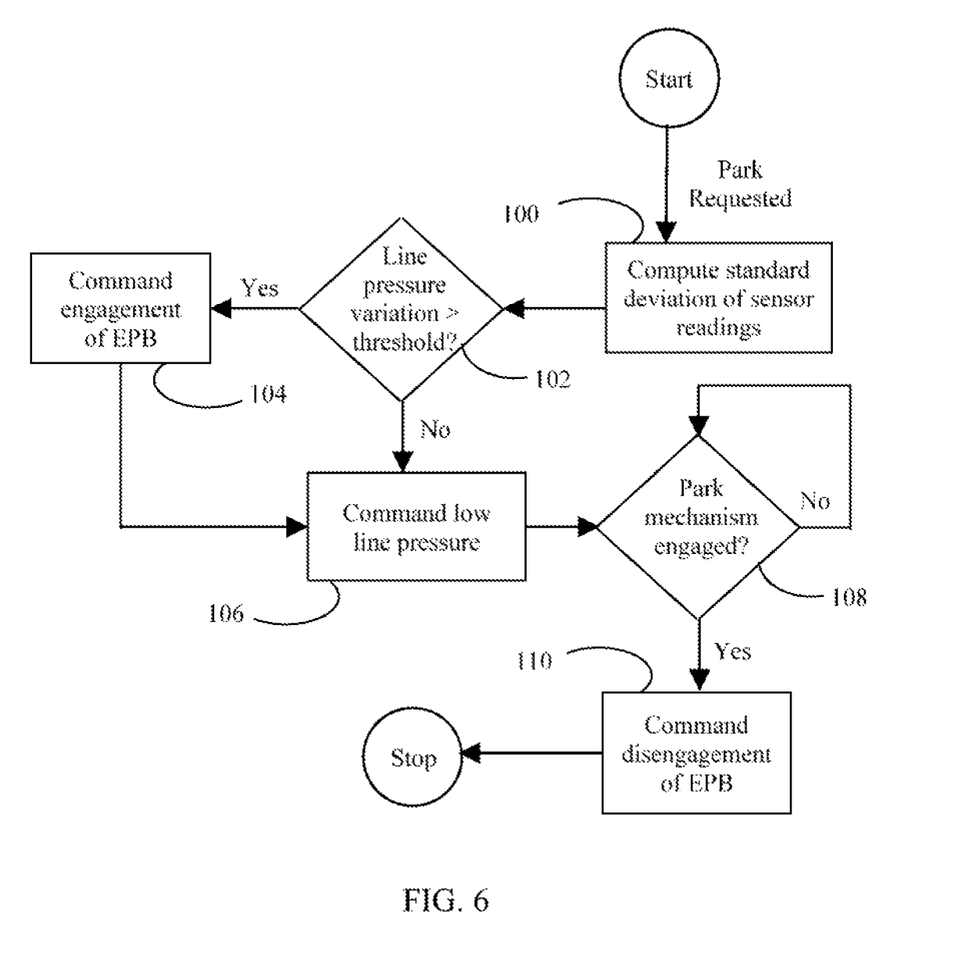
FIG. 6 is a flow chart for a method of engaging park.

FIG. 6 illustrates a process for entering park. This process is initiated in response to a request to enter park. Typically, the request would result from a driver moving a shift selector into a park position. At 100, the controller computes a standard deviation of a number of recent pressure readings. The controller may continuously store a fixed number of the most recent readings in anticipation of this calculation. Other metrics of variation may be suitable. At 102, the controller compares this metric of variation to a threshold. If the variation metric exceeds the threshold, then the controller commands engagement of the electronic parking brake at 104. At 106, the controller commands engagement of the hydraulically actuated park mechanism by commanding low line pressure. Then, the controller waits at 108 until it can confirm successful engagement of the hydraulically actuated park mechanism. This confirmation may come, for example, from position sensors in the park mechanism. At 110, the controller commands disengagement of the electronic parking brake if it was engaged at 104.

Another problem that can result from air in the pump intake is loss of pump priming. This is particularly likely if the system is shut down for a period of time such that small air bubbles have an opportunity to coalesce into large air bubbles. Positive displacement pumps are much better at moving liquid than at moving a gas. It may be necessary to increase pump speed in order to reduce the pressure of the air bubble enough to draw fluid into the pump intake. A delay in priming the pump after an engine start may also result in a delay in engaging shift elements to establish drive or reverse and in disengaging the park mechanism.

Figure 7:
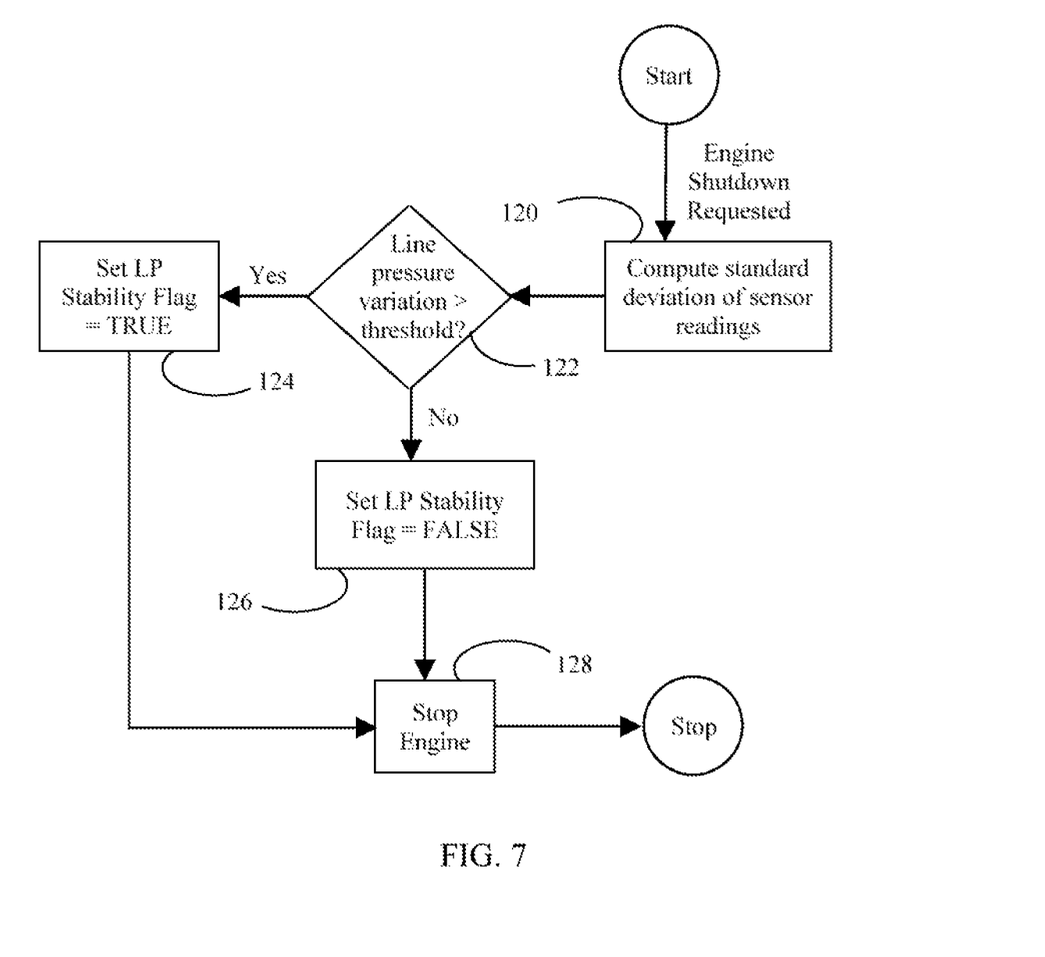
FIG. 7 is a flow chart for a method of shutting off an engine.
Figure 8:
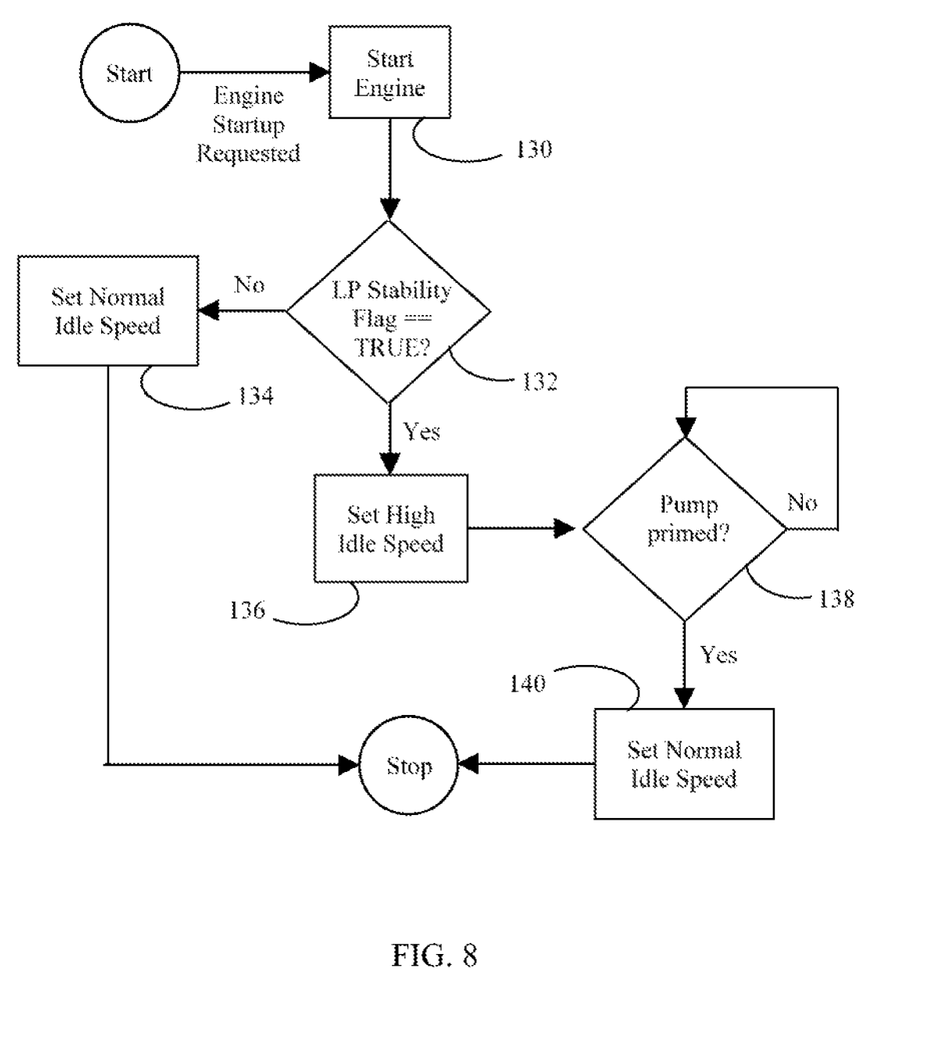
FIG. 8 is a flow chart for a method of restarting an engine.

FIGS. 7 and 8 describe a process to mitigate issues with pump priming. The process of FIG. 7 is initiated by an engine shutdown request. The engine shutdown request may come from the driver or may be part of a control strategy to automatically shut off the engine during idling periods to save fuel. At 120, the controller computes a variation metric such as standard deviation as described previously with respect to step 100. If the metric is greater than a threshold at 122, a flag is set to TRUE at 124. Otherwise the flag is set to FALSE at 126. At 128, the controller stops the engine as requested.

The process of FIG. 8 is initiated by an engine start request. At 130, the controller starts the engine as requested. If the flag is not set to TRUE at 132 (i.e. it is set to FALSE), then the controller sets the idle speed to the normal idle setting at 134. If the flag is set to TRUE at 132, then the controller sets the idle speed to a higher level at 136. Then, the controller waits at 138 for an indication that the pump has been successfully primed. For example, a stable pressure reading at the commanded level would indicate proper pump priming. Once the pump is primed, the controller reduces the idle speed at 140 to its normal level.

In addition to the problems mentioned above, line pressure instability may cause other issues, such as variation in engagement times of clutches. Consequently, other control system parameters may be varied based on the line pressure variability metric to mitigate these issues.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    a transmission including a fluid pressure sensor and a hydraulically actuated park mechanism;
    an electronic park brake; and
    a controller programmed to, responsive to a request for park,
        command engagement of the hydraulically actuated park mechanism and
        responsive to variation of a reading from the pressure sensor greater than a threshold, command the electronic parking brake to engage until engagement of the hydraulically actuated park mechanism completes.

2. The vehicle of claim 1 wherein the transmission includes a pump and the pressure sensor is configured to measure a pressure of fluid leaving the pump.

3. The vehicle of claim 1 wherein the controller is further programmed to release the electronic parking brake in response to confirming engagement of the hydraulically actuated park mechanism.

4. The vehicle of claim 1 wherein the controller is programmed to compute the variation by calculating a standard deviation over a number of readings preceding the request for park.

5. The vehicle of claim 1 wherein the transmission includes a clutch with a clutch apply chamber and the pressure sensor is configured to measure a pressure of fluid in the clutch apply chamber.

6. The vehicle of claim 5 wherein the controller is programmed to compute the variation by calculating a standard deviation over a number of readings preceding the request for park while the clutch is fully engaged.

7. A vehicle comprising:
    a transmission including a fluid pressure sensor, hydraulically actuated park mechanism, and a pump,
    wherein the pressure sensor is configured to measure a pressure of fluid leaving the pump;
    an electronic park brake; and
    a controller programmed to, responsive to a request for park,
        command engagement of the hydraulically actuated park mechanism and
        responsive to variation of a reading from the pressure sensor greater than a threshold, command the electronic parking brake to engage until engagement of the hydraulically actuated park mechanism completes;
        release the electronic parking break in response to confirming engagement of the hydraulically actuated park mechanism.

8. The vehicle of claim 7 wherein the controller is programmed to compute the variation by calculating a standard deviation over a number of readings preceding the request for park.

9. The vehicle of claim 7 wherein the transmission includes a clutch with a clutch apply chamber and the pressure sensor is configured to measure a pressure of fluid in the clutch apply chamber.

10. The vehicle of claim 9 wherein the controller is programmed to compute the variation by calculating a standard deviation over a number of readings preceding the request for park while the clutch is fully engaged.

* * * * *